United States Patent
Kahl (10) Patent No.: US 9,933,005 B2
(45) Date of Patent: Apr. 3, 2018

(54) RETAINING RING RETENTION SYSTEM AND METHOD

(71) Applicant: MACK TRUCKS, INC., Greensboro, NC (US)

(72) Inventor: Michael E. Kahl, Hagerstown, MD (US)

(73) Assignee: VOLVO LASTVAGNAR AB, Göteborg (SE)

( * ) Notice: Subject to any disclaimer, the term of this patent is extended or adjusted under 35 U.S.C. 154(b) by 0 days.

(21) Appl. No.: 14/649,659

(22) PCT Filed: Dec. 13, 2012

(86) PCT No.: PCT/US2012/069429
§ 371 (c)(1),
(2) Date: Jun. 4, 2015

(87) PCT Pub. No.: WO2014/092708
PCT Pub. Date: Jun. 19, 2014

(65) Prior Publication Data
US 2015/0308488 A1    Oct. 29, 2015

(51) Int. Cl.
F16B 21/18    (2006.01)
F16B 43/00    (2006.01)
B23P 19/08    (2006.01)

(52) U.S. Cl.
CPC ............ F16B 43/00 (2013.01); B23P 19/084 (2013.01); F16B 21/186 (2013.01)

(58) Field of Classification Search
CPC .............................. F16B 21/18; F16B 21/186
USPC ................................................ 411/517–519
See application file for complete search history.

(56) References Cited

U.S. PATENT DOCUMENTS

| | | | |
|---|---|---|---|
| 2,650,484 A | 5/1947 | Bujak | |
| 2,895,754 A * | 7/1959 | Wurzel | F16B 21/186 403/316 |
| 2,897,022 A * | 7/1959 | Marola | F16C 35/063 384/584 |
| 3,214,204 A | 10/1965 | Carter | |

(Continued)

FOREIGN PATENT DOCUMENTS

CN    1135367 A    11/1996
JP    2004068845 A    4/2004

OTHER PUBLICATIONS

US 5,778,399, 08/1998, Smearsoll (withdrawn)

(Continued)

*Primary Examiner* — Flemming Saether
(74) *Attorney, Agent, or Firm* — Michael Pruden; Martin Farrell (57) ABSTRACT

The present invention relates to a retained member configured to prevent centrifugal force from disassociating a retaining ring provided with lugs from a groove located on a rotatable shaft when securing the retained member to the rotatable shaft and rotating with the shaft. The retained member includes a substantially annular portion and a retention lip provided with a cutout portion. The substantially annular portion defines an opening sized to receive the rotatable shaft so that the retained member is rotatable with the shaft. The cutout portion is configured to accommodate the lugs when in an installing position as the retained member is snap fit into the groove.

3 Claims, 7 Drawing Sheets

(56) References Cited

U.S. PATENT DOCUMENTS

| | | | | |
|---|---|---|---|---|
| 3,535,977 | A | | 10/1970 | Baumgarten |
| 3,924,957 | A | * | 12/1975 | Camosso ................ F16B 21/18 |
| | | | | 384/538 |
| 3,992,117 | A | | 11/1976 | Ristau |
| 4,138,168 | A | | 2/1979 | Herlitzek |
| 5,127,764 | A | * | 7/1992 | Baer .................... F16B 21/186 |
| | | | | 403/316 |
| 5,462,369 | A | * | 10/1995 | Layne ................... F16C 35/063 |
| | | | | 384/538 |
| 5,484,242 | A | | 1/1996 | Meyer |
| 5,607,192 | A | | 3/1997 | Lee |
| 5,788,399 | A | * | 8/1998 | Smearsoll ................ F16D 1/06 |
| | | | | 403/319 |
| 6,116,809 | A | | 9/2000 | Raszkowski |
| 6,884,196 | B1 | | 4/2005 | Ziech |
| 2002/0018719 | A1 | | 2/2002 | Arilla et al. |
| 2011/0283491 | A1 | * | 11/2011 | Ainslie ................ F16B 21/186 |
| | | | | 24/530 |
| 2012/0051918 | A1 | | 3/2012 | Glasspoole |

OTHER PUBLICATIONS

Extended European search report dated Jun. 28, 2016 for corresponding European application 12889841.8.
International Search Report (dated Feb. 20, 2013) for corresponding International App. PCT/US2012/069429.
International Preliminary Report on Patentability (dated Dec. 3, 2014) for corresponding International App. PCT/US2012/069429.
1st Office Action dated Apr. 1, 2016 for corresponding China application No. 201280077706.7 translated.

* cited by examiner

RETAINING RING RETENTION SYSTEM AND METHOD

FIELD OF THE INVENTION

The present invention relates to a retaining ring retention system and method and in particular to a retaining ring retention system and method for applications involving centrifugal force.

BACKGROUND OF THE INVENTION

Retaining rings are typically used to secure one or more components on a shaft. In a typical application at least one component is slid onto the shaft and then the ring is expanded and snap fit within a groove formed in the end of the shaft. The component(s) cannot be removed without first removing the retaining ring, usually via the use of a retaining ring tool, such as retaining ring pliers, to grasp the lugs and apply a force to spread them apart.

In situations where retaining rings are located on a spinning shaft and subjected to centrifugal force, sufficient centrifugal force can cause the retaining ring to expand radially and dislocate from the retaining groove. Although manufacturers of retaining rings typically publish maximum speeds for retaining rings, sometimes these speeds are exceed by accident or necessity.

The present invention relates to a retaining ring retention system and method and in particular to a retaining ring retention system and method for applications involving centrifugal force.

SUMMARY OF THE INVENTION

According to one embodiment of the present invention, a retained member configured to prevent centrifugal force from disassociating a retaining ring provided with lugs from a groove located on a rotatable shaft when securing the retained member to the rotatable shaft and rotating with the shaft includes a substantially annular portion and a retention lip provided with a cutout portion. The annular portion defines an opening sized to receive the rotatable shaft so that the retained member is rotatable with the shaft. The cutout portion is configured to accommodate the lugs when in an installing position as the retained member is snap fit into the groove. The retention lip is configured to circumscribe the lugs when the lugs are rotated relative to the installing position into an installed position and in the groove to prevent the lugs from being forced apart by the centrifugal force such that the retaining ring could disassociate from the groove.

According to another embodiment of the present invention, a method for providing a retained member configured to prevent centrifugal force from disassociating a retaining ring provided with lugs from a groove located on a rotatable shaft when securing the retained member to the rotatable shaft and rotating with the shaft includes the step of providing a retained member that includes a substantially annular portion that defines an opening and a retention lip that includes a cutout portion, wherein the opening is sized to receive the rotatable shaft so that the retained member is rotatable with the shaft, the cutout portion is configured to accommodate the lugs when in an installing position as the retained member is snap fit into the groove, and the retention lip is configured to circumscribe the lugs when the lugs are rotated relative to the installing posting into an installed position and in the groove to prevent the lugs from being forced apart by the centrifugal force such that the retaining ring may disassociate from the groove.

According to yet another embodiment of the present invention, retaining ring retention system includes a rotatable shaft, a retaining ring, and a retained member. The rotatable shaft provided with a groove. The retaining ring is provided with lugs including an installed position and an installing position, wherein a distance between the lugs is greater when in the installing position than in the installed position and when the lugs are in the installed position the retaining ring is rotated relative to when in the expanded installed position and the retaining ring is located in the groove and rotatable with the rotatable shaft. The retained member is secured to the rotatable shaft by the retaining ring, defines an opening that receives the rotatable shaft so that the retained member is rotatable with the rotatable shaft, and is provided with a retention lip that circumscribes the lugs when in the installed position to prevent the lugs from being forced apart by centrifugal force such that the retaining ring may disassociate from the groove and includes a cutout portion that accommodates the lugs when in the installing position.

According to still yet another embodiment of the present invention, a method for installing a retaining ring and a retained member on a rotatable shaft provided with a groove includes the steps of providing the retaining ring that includes lugs provided with an installed position and an installing position, wherein a distance between the lugs is greater when in the installing position than in the installed position, providing a retained member that is provided with a retention lip that is adapted to circumscribe the lugs when in the installed position so that the retention lip prevents the lugs from being forced apart by centrifugal force such that the retaining ring may disassociate from the groove and includes a cutout portion that accommodates the lugs when in the installing position, installing the retained member around the rotatable shaft so that the retained member is rotatable with the rotatable shaft, positioning the lugs of the retaining ring within the cutout portion of the retained member and forcing the lugs apart to provide the lugs with the installing position, snap fitting the retaining ring in the groove so that the retaining ring is rotatable with the rotatable shaft and the retaining ring secures the retained member to the rotatable shaft, and rotating the retaining ring relative to the installing position to provide the installed position, whereat the retention lip circumscribes the lugs so that the retention lip prevents the lugs from being forced apart by centrifugal force such that the retaining ring may disassociate from the groove.

DETAILED DESCRIPTION OF THE INVENTION

Figure 1:
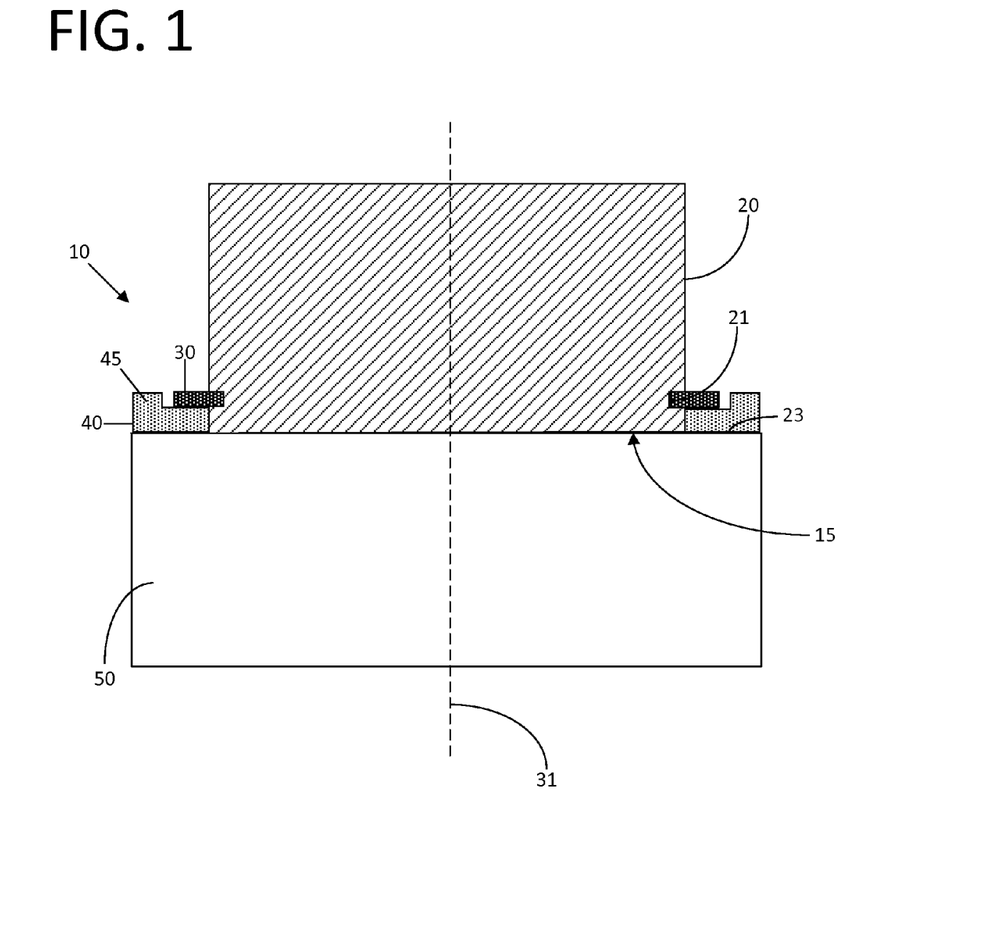
FIG. 1 depicts a retaining ring retention system, partially in section, according to one embodiment.

FIG. 1 depicts an embodiment of a retaining ring retention system 10 provided with a rotatable shaft 20 that includes a groove 21, a retaining ring 30, and a retained member 40. In the presently preferred embodiment the rotatable shaft 20 is a component of a vehicle powertrain 15 and the retained member 40 is a thrust washer; however those of ordinary skill in the art will appreciate that it is within the scope of the present embodiment to employ the principals of the present embodiment in conjunction with any type of rotatable shaft, including rotatable shafts for use outside of vehicle powertrains, and any type of retained member, including, but not limited to gears, pulleys, and sheaves.

Figure 2:
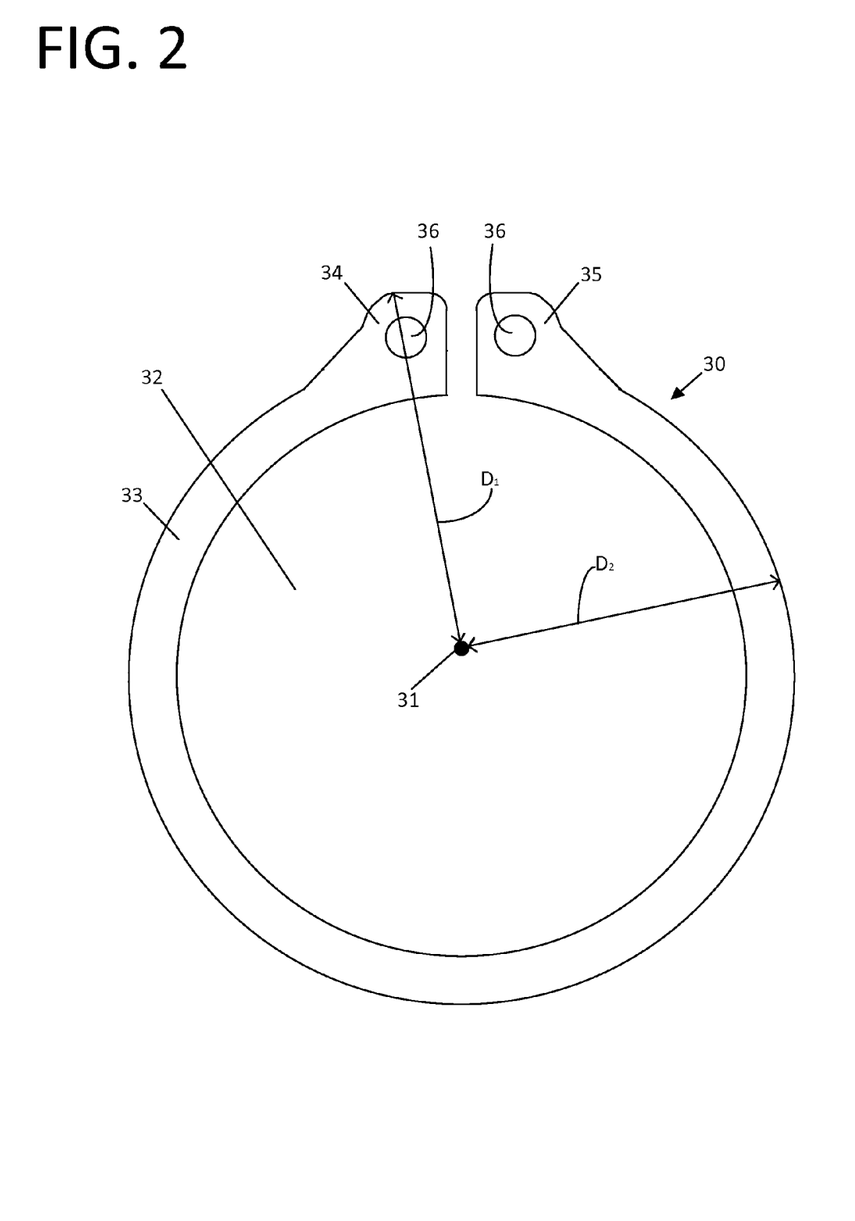
FIG. 2 depicts a top down perspective view of a retaining ring according to one embodiment.

Turning now to FIGS. 1 and 2, the retaining ring 30 of the present embodiment is shown provided with an axis 31, a central opening 32, defined by a substantially annular portion 33, and first and second lug portions 34, 35. As shown in FIG. 2, the first and second lug portions 34, 35 extend radially outward relative to the axis 31 a distance D1 and the substantially annular portion 33 extends radially outward relative to the axis 31 a distance D2. As shown, the distance $D_1$ is preferably greater than the distance $D_2$.

Figure 3:
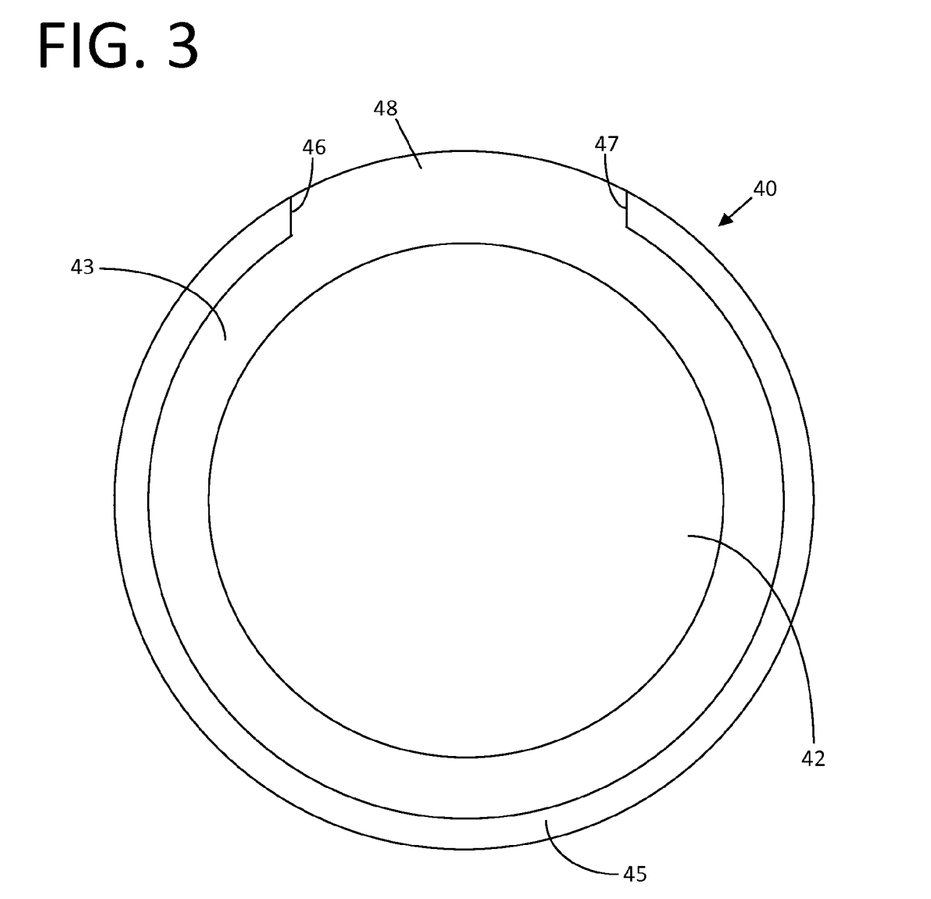
FIG. 3 depicts a top down perspective view of a retained member according to one embodiment.

Turning now to FIG. 3 the retained member 40 of the present embodiment is shown provided with a central opening 42 defined by a substantially annular portion 43 and a retention lip 45. As shown in FIG. 1, the opening 42 is sized to receive the rotatable shaft 20, so that the retained member 40 rotates with the rotatable shaft 20. The retained member 40 may be configured to rotate with the rotatable shaft 20 by being provided with internal splines (not shown) that are complementary to splines (not shown) on the rotatable shaft 20 or via a friction or interference fit, for example. As shown in FIGS. 1 and 3, the retention lip 45 may be located on periphery of the substantially annular portion 43 and extend generally orthogonal from a substantially flat face of the substantially annular portion 43. The retention lip 45 is preferably semi-circular in shape and includes at least one cutout portion 48 that, in the presently illustrated embodiment, separates first and second ends 46, 47 of the retention lip 45 and is substantially coplanar with the annular portion 43.

Figure 5:
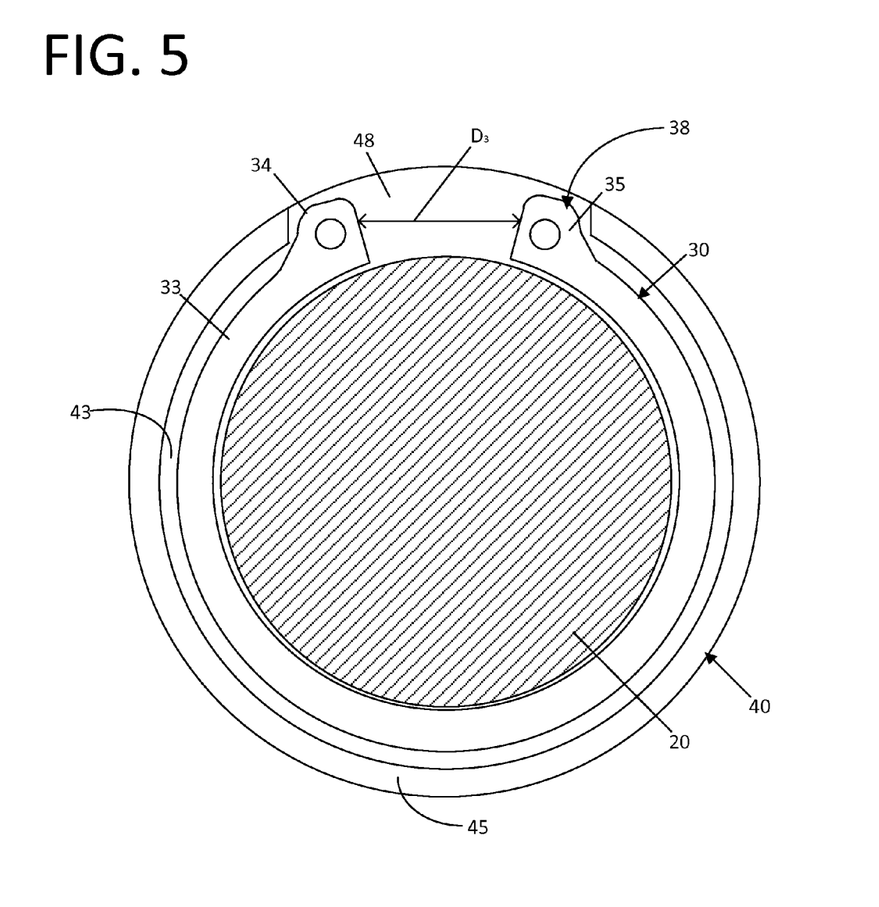
FIG. 5 depicts a top down perspective view of a retained member receiving a rotatable shaft and a retaining member with lugs shown in an installing position of one embodiment.

According to one aspect of the present embodiment the retaining ring 30 is configured to be installed in the groove 21 that extends circumferentially around the rotatable shaft 20. As shown, by a comparison of FIGS. 5 and 6, the lug portions 34, 35 are provided with installed position 37 (FIG. 7) and an installing position 38 (FIG. 5). Also shown, when in the installing position 38, a distance $D_3$ between the lugs 34, 35 is greater than a distance $D_4$ between the lugs 34, 35, when in the installed position 37. Also shown, relative to the installing position 38, the retaining ring is rotated when in the installed position 37. As shown in FIGS. 1 and 7, when the lugs 34, 35 are in the installed position 37 the retaining ring is located in the groove 21 on the rotatable shaft 20 and the lugs 34, 35 are circumscribed by the retention lip 45 of the retained member 40. Those of ordinary skill in the art will appreciate that a retaining ring tool (not shown), such as retaining ring pliers (not shown), may engage openings 36 (FIG. 2) in the lugs 34, 35 and force the lugs 34, 35 apart to expand the size of the central opening 32 so that the retaining ring 30 is able to be positioned into the installing position 38, whereat the retaining ring 30 may be slipped around the rotatable shaft 20 and snap fit into the groove 21.

According to another aspect of the present embodiment, the retaining ring 30 is configured to secure the retained member 40 on the shaft 20. According to yet another aspect of the present embodiment, the retaining ring 30 and retained member 40 are configured to cooperate to prevent centrifugal force generated by the rotatable shaft 20 from forcing the lugs 34, 35 apart and expanding the size of the central opening 32 in a manner which allows the retaining ring 30 to disassociate from the groove 21 and potentially disassociate from the rotatable shaft 20.

Figure 4:
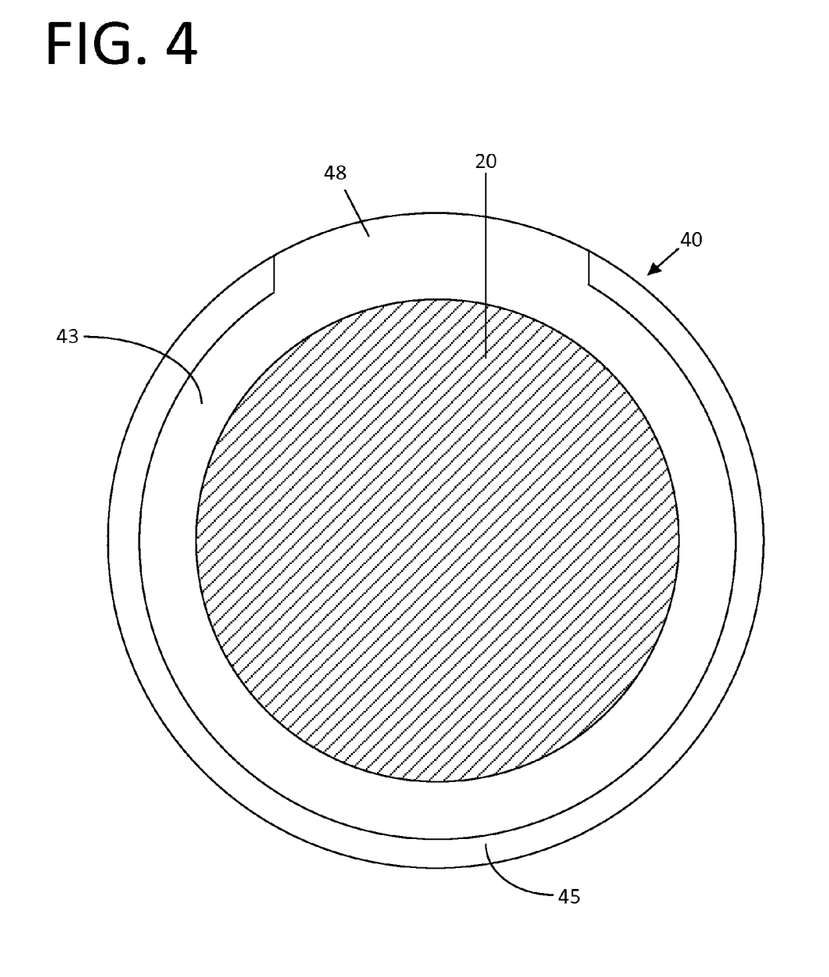
FIG. 4 depicts a top down perspective view of a retained member receiving a rotatable shaft according to one embodiment.

Turning now to FIGS. 4-7, the preferred installation method for the retaining ring retention system 10 will now be described. As shown in FIG. 4, first the retained member 40 is installed by being slipped around the rotatable shaft 20 until seated on a shoulder 23, which may be provided on another rotatable member 50, one example of which is shown in FIG. 1, or on the rotatable shaft 20 itself. In the present embodiment the retained member 40 is configured to rotate with the rotatable shaft 20. As shown in FIG. 1, when the retained member 40 is seated on the shoulder 23 the retention lip 45 is preferably co-planar with the groove 21 and preferably extends radially outward from the groove 21.

Figure 6:
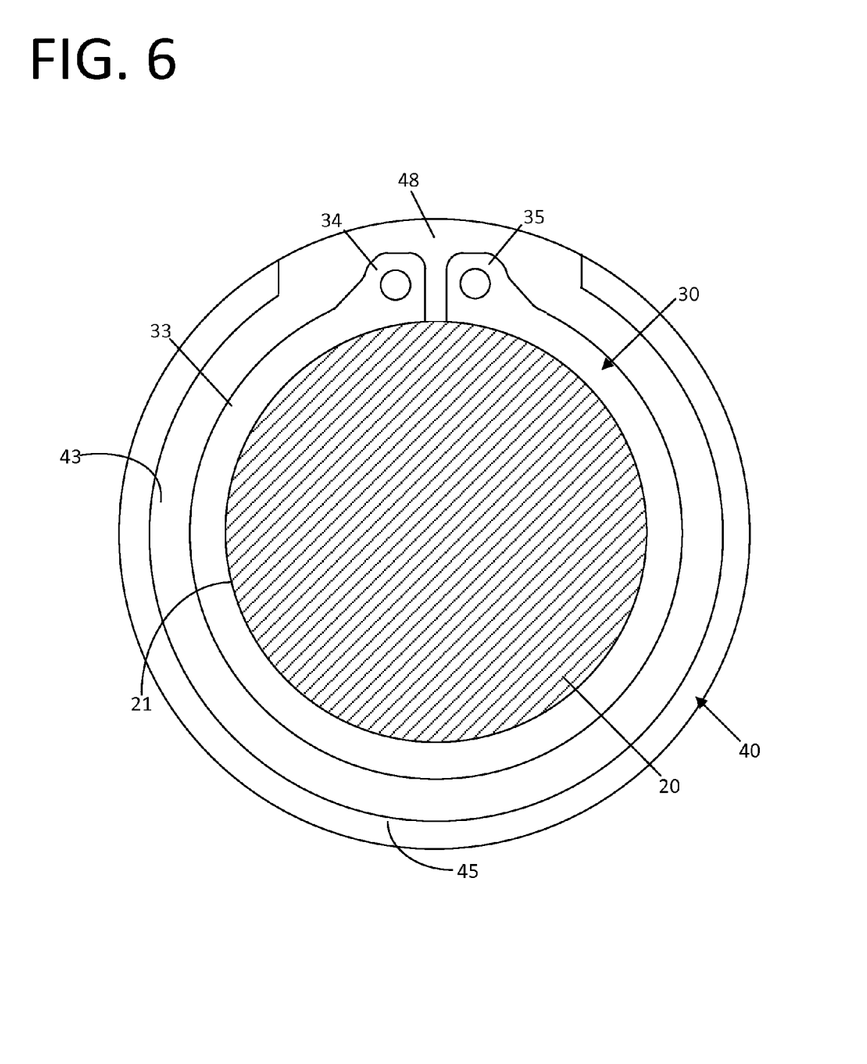
FIG. 6 depicts a top down perspective view of a retained member receiving a rotatable shaft and a retaining member snap fit in a groove on the rotatable shaft of one embodiment.
Figure 7:
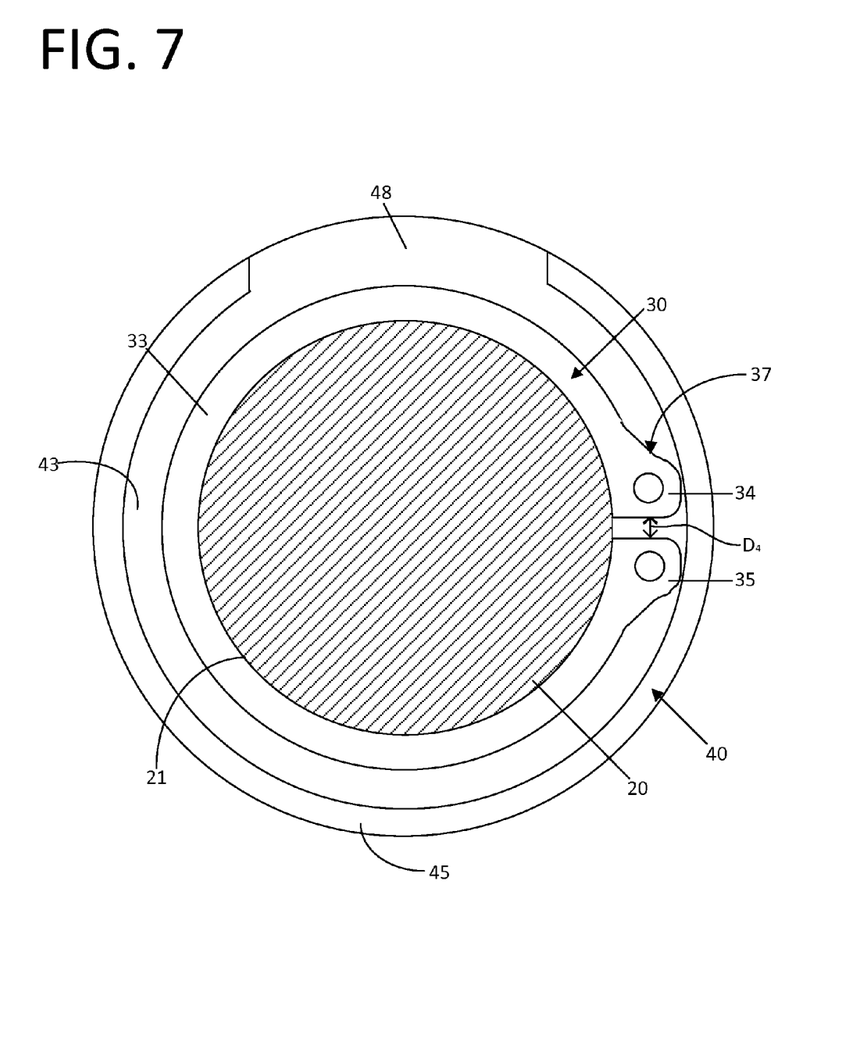
FIG. 7 depicts a top down perspective view of a retained member receiving a rotatable shaft and a retaining member with lugs shown in an installing position of one embodiment.

As shown in FIGS. 5 and 6, after the retained member 40 is installed on the shaft 20, the retaining ring 30 is then installed by being slipped around the rotatable shaft 20, which is accomplished by forcing the lugs 34, 35 apart so that the retaining ring 30 is in the installing position 38. As shown in FIGS. 1 and 6, when the retaining ring 30 is co-planar with the groove 21 and the lugs 34, 35 are no longer forced apart, the retaining ring 30 snap fits into the groove 21. During this step, as shown in FIGS. 5 and 6, the lugs 34, 35 are positioned within the cutout portion 48 of the retention lip 45, which accommodates the spaced apart lug portions 34, 35 when in the installing position 38. Those of ordinary skill in the art will appreciate that once the retaining ring 30 is snap fit into the groove 30 that the retaining ring 30 secures the retained member 40 on the shaft 20.

Turning now to FIG. 7, in order to prevent centrifugal force generated by the rotatable shaft 20 from forcing the lugs 34, 35 apart and expanding the size of the central opening 32, such that the retaining ring 30 could disassociate from the groove 21 and potentially disassociate from the rotatable shaft 20, the retaining ring is rotated so that the lugs 34, 35 are in the installed position 37 and no longer located within the cutout portion 48 of the retained member 40. As shown, upon rotation of the retaining ring 30 into the installed position, the lugs 34, 35 are positioned so that the retention lip 45 circumscribes the lugs 34, 35 so that the retention lip 45 acts as a boundary that prevents the lugs 34, 35 from being forced apart by centrifugal force in a manner that could otherwise result in expansion in the size of the central opening 32 such that the retaining ring 30 disassociate from the groove 21. Since the retaining ring 30 and retained member 40 are both rotatable with the rotatable shaft 20 at the same speed, the retaining ring 30 will remain in the installed position shown in FIG. 7 until it is desired to remove the retaining ring 30, which may be accomplished by manually rotating the retaining ring 30 to the position shown in FIG. 6.

The present description depicts specific examples to teach those skilled in the art how to make and use the best mode of the invention. For the purpose of teaching inventive principles, some conventional aspects have been simplified or omitted. The detailed descriptions of the above embodiments are not exhaustive descriptions of all embodiments contemplated by the inventors to be within the scope of the invention. Those skilled in the art will appreciate variations from these examples that fall within the scope of the invention.

Persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Thus, although specific embodiments of, and examples for, the invention are described herein for illustrative purposes, various equivalent modifications are possible within the scope of the invention, as those skilled in the relevant art will recognize. Accordingly, the scope of the invention is determined from the appended claims and equivalents thereof.

I claim:

1. A method for installing a retaining ring and a retained member on a rotatable shaft provided with a groove, comprising the steps of:
    providing the retaining ring that includes lugs provided with an installed position and an installing position, wherein:
        a distance between the lugs is greater when in the installing position than in the installed position;
    providing a retained member that is provided with a semi-circular retention lip that:
        is adapted to circumscribe the lugs when in the installed position so that the retention lip prevents the lugs from being forced apart by centrifugal force such that the retaining ring may disassociate from the groove; and
        includes a cutout portion, which separates first and second ends of the retention lip and accommodates the lugs when in the installing position;
    installing the retained member around the rotatable shaft so that the retained member is rotatable with the rotatable shaft;
    positioning the lugs of the retaining ring within the cutout portion of the retained member by forcing the lugs apart to provide the lugs with the installing position;
    snap fitting the retaining ring in the groove so that the retaining ring is rotatable with the rotatable shaft and the retaining ring secures the retained member to the rotatable shaft;
    rotating the retaining ring relative to the installing position to provide the installed position, whereat the retention lip circumscribes the lugs so that the retention lip prevents the lugs from being forced apart by centrifugal force such that the retaining ring may disassociate from the groove.

2. The method for installing the retaining ring and the retained member on the rotatable shaft provided with the groove according to claim 1, wherein the retained member is a thrust washer.

3. The method for installing the retaining ring and the retained member on the rotatable shaft provided with the groove according to claim 1, wherein the rotatable shaft is a component of a vehicle power train.

* * * * *